United States Patent
Kitamura et al.

(10) Patent No.: US 6,717,298 B2
(45) Date of Patent: Apr. 6, 2004

(54) MOTOR APPARATUS

(75) Inventors: Shingo Kitamura, Odawara (JP); Haruhiko Nakatsu, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,289

(22) Filed: Dec. 8, 1999

(65) Prior Publication Data
US 2003/0067227 A1 Apr. 10, 2003

(30) Foreign Application Priority Data
Dec. 10, 1998 (JP) .......................... 10-374982

(51) Int. Cl.⁷ ................................ H02K 5/24
(52) U.S. Cl. ........................ 310/51; 310/261
(58) Field of Search ................... 310/51, 183, 90.5; 360/75; 74/87

(56) References Cited

U.S. PATENT DOCUMENTS

| | | | | |
|---|---|---|---|---|
| 4,160,268 A | * | 7/1979 | Goto et al. ................ | 358/128 |
| 4,646,531 A | * | 3/1987 | Song ......................... | 62/187 |
| 5,182,738 A | * | 1/1993 | Yoshikawa ................ | 359/819 |
| 5,394,044 A | * | 2/1995 | Yamamura ................ | 310/36 |
| 5,416,658 A | * | 5/1995 | Sega et al. ................ | 360/106 |
| 5,528,348 A | * | 6/1996 | Miwa et al. ............... | 355/211 |
| 5,751,687 A | * | 5/1998 | Ariyoshi et al. .......... | 369/202 |
| 5,767,425 A | * | 6/1998 | Miyagawa et al. ........ | 73/866.3 |
| 5,811,906 A | * | 9/1998 | Hakala et al. ............. | 310/183 |
| 5,873,786 A | * | 2/1999 | Hosoya et al. ............ | 464/73 |
| 6,051,169 A | * | 4/2000 | Brown et al. ............. | 264/40.1 |
| 6,055,399 A | * | 4/2000 | Omura ...................... | 399/167 |
| 6,065,447 A | * | 5/2000 | Saeki et al. ............... | 123/339.27 |
| 6,097,918 A | * | 8/2000 | Inoue et al. ............... | 399/265 |
| 6,137,629 A | * | 10/2000 | Shopp ....................... | 359/461 |
| 6,213,737 B1 | * | 4/2001 | Murakami et al. ........ | 417/423.4 |
| 6,240,889 B1 | * | 6/2001 | Kuwabara et al. ........ | 123/179.24 |
| 6,378,672 B1 | * | 4/2002 | Wakui ....................... | 188/378 |

FOREIGN PATENT DOCUMENTS

| | | | |
|---|---|---|---|
| DE | 0633647 A1 | * | 11/1995 |
| JP | 358077946 A | * | 5/1983 |
| JP | 405199687 A | * | 8/1993 |
| JP | 406137375 A | * | 5/1994 |
| JP | 406147260 A | * | 5/1994 |
| JP | 2001167511 A | * | 6/2001 |

* cited by examiner

*Primary Examiner*—Nestor Ramirez
*Assistant Examiner*—Julio Gonzalez
(74) *Attorney, Agent, or Firm*—Fitzpatrick, Cella, Harper & Scinto

(57) ABSTRACT

An image reading apparatus used for a motor to scan an original for image reading, includes a first damper mounted on the drive shaft of the motor to reduce vibration caused during acceleration for raising up to a target speed at the start of the load driving of the motor, and a second damper mounted on the drive shaft of the motor to reduce vibration caused during the constant speed driving of the motor to thereby reduce vibration caused during the driving of the motor.

3 Claims, 6 Drawing Sheets

MOTOR APPARATUS

BACKGROUND OF THE INVENTION

1. Field of the Invention

This invention relates to a motor apparatus for reducing the vibration of a motor, and particularly to a motor apparatus suitable for an image reading apparatus or the like.

2. Related Background Art

In an image reading apparatus used in a copying machine or the like, a stepping motor has heretofore been used because highly accurate positioning of a movable member is required. To drive the movable member of the image reading apparatus at a high speed with low vibration by the stepping motor, the acceleration and deceleration of the motor are requisite.

Also, to read color information, reading at a constant speed, free of vibration, is necessary and therefore, it is popular in the design of the apparatus to provide an approach run distance required until the vibration created after the acceleration becomes null.

Also, regarding the vibration in the constant speed portion of the motor rotation, the motor becomes a vibration source due to a torque ripple conforming to a step angle and the thin lines of an image become jaggy. To combat this problem, it is possible to use a magnet damper that does not add to the inertia to the motor shaft during the aforementioned acceleration operation, but adds to the inertia to the motor shaft when it is moving at a constant speed for the reason set forth later, to thereby smooth the rotation between step angles, and it is possible to reduce the vibration.

It is also possible to fractionate the step angle of the motor to thereby reduce the torque ripple and reduce the vibration.

However, the number of images read by the image reading apparatus per unit time has become higher year by year and therefore, it has become impossible to secure a sufficient approach run distance. Also, when the inertia working during acceleration is added to the motor shaft, the acceleration time increases and a higher speed becomes impossible and a very great inertia could not be given. Therefore, the vibration components of the distal end of a read image have become large and the distal end of the read image becomes jaggy, and this has caused a great reduction in the quality of the image.

The reason set forth above has become a factor for greatly reducing the quality of the produced image by being jaggy or a factor for hindering the downsizing of the apparatus by the increase in the approach run distance resulting from a higher reading speed.

SUMMARY OF THE INVENTION

The present invention has been made in view of the above-noted situation and an object thereof is to provide a motor apparatus reduced in vibration caused during acceleration and during operation at a constant speed.

Another object of the present invention is to mount two damper means on a motor drive shaft to thereby reduce vibration caused during the driving of the motor.

Still another object of the present invention is to use a magnet damper as a first damper means and use a rubber damper as a second damper means.

Yet still another object of the present invention is to use a magnet damper and a rubber damper to shorten the reading time of an image to thereby increase the speed of the apparatus.

DESCRIPTION OF THE PREFERRED EMBODIMENTS

Figure 1:
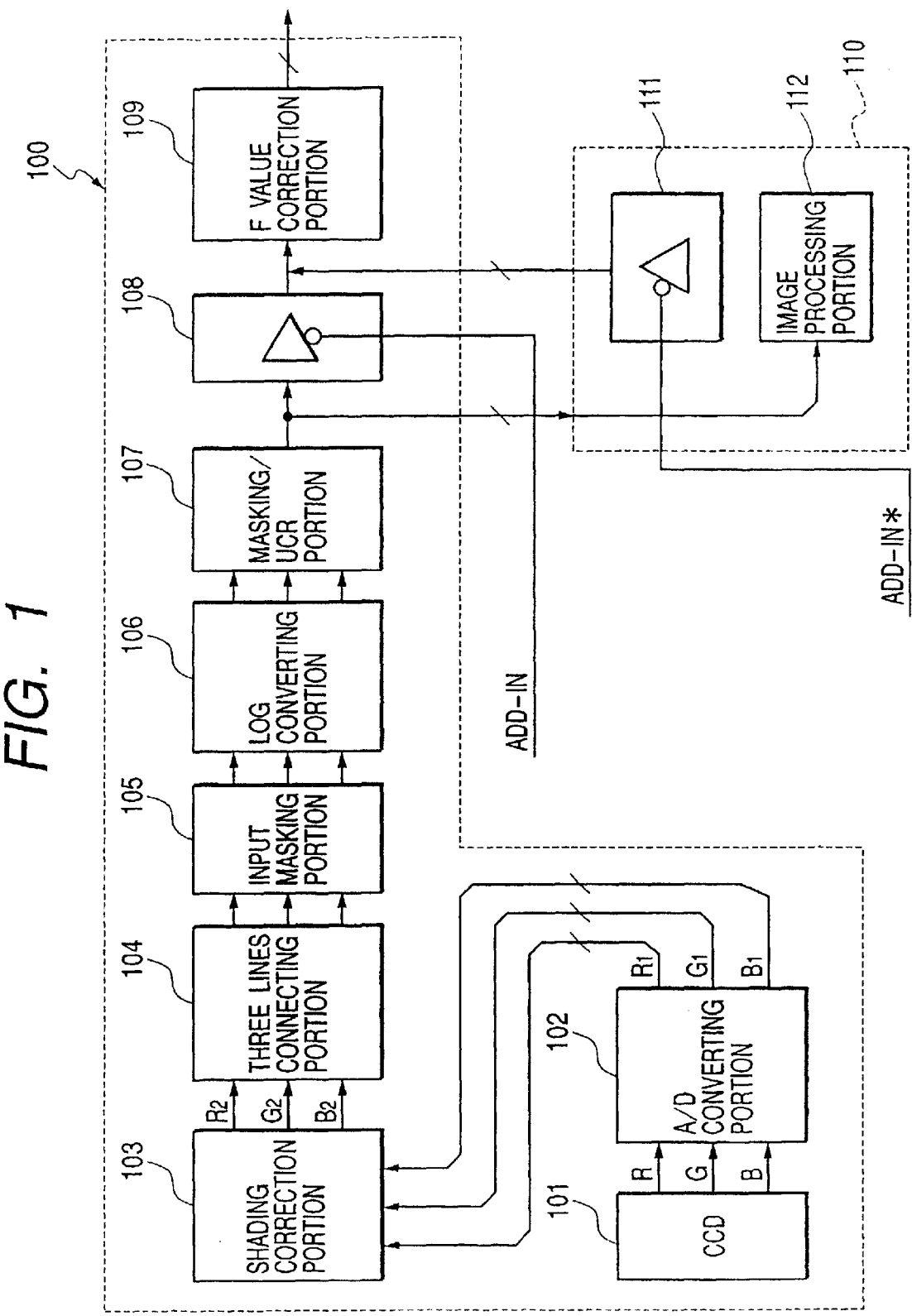
FIG. 1 is a block diagram of the image processing circuit of a digital full color copying machine according to the present invention.

FIG. 1 is a block diagram of the image processing circuit of the digital full color copying machine of the present invention. The reference numeral 100 designates the main substrate of the image processing circuit, which includes the following parts.

The reference numeral 101 denotes a three-line CCD for color-resolving the reflected light from an original and converting it into an electrical signal. The reference numeral 102 designates an A/D converting portion for converting an analog signal RGB from the CCD 101 into a digital signal.

A shading correction portion 103 corrects the sensitivity of each pixel of the CCD 101 and corrects the inclination of the quantity of light of a light source. In FIG. 1, R (red), G (green) and B (blue) signals are 8-bit digital image signals outputted from the A/D converting portion 102.

The CCD 101 used in the present embodiment comprises three CCD line sensors for R (red), G (green) and B (blue) disposed at predetermined distances. Therefore, the digital image signals are signals having a time deviation created by spatial deviation. This time deviation is corrected in a three lines connecting portion 104 in FIG. 1.

An input masking portion 105 effects a calculation for correcting the RGB spectral characteristic of the CCD 101 to a standard RGB space.

A LOG converting portion 106 is a look-up table comprised of a RAM, by which R (red), G (green) and B (blue) luminance signals are converted into C (cyan), M (magenta) and Y (yellow) density signals, respectively.

A masking/UCR portion 107 effects a calculation for removing the color turbidity of toners used for print recording from the inputted C (cyan), M (magenta) and Y (yellow) density signals and produces a Bk (black) signal.

An F value correction portion is a correction table for correcting a density value (F value) for each color in accordance with the designation of the density at which printing is to be effected.

The reference numeral 108 designates a tristate buffer, which is controlled by an ADD-IN signal. The reference numeral 110 denotes an image processing substrate provided with a tristate buffer 111 and an image processing portion 112. The image processing portion 112 is a portion for effecting such processing as extracting the outline portion of an image. The reversed signal of the ADD-IN signal is inputted to the tristate buffer 111. Therefore, the tristate buffer 111 and the tristate buffer 108 are in a converse relation so that if one of them becomes a buffer with a high impedance, the other may become a buffer with a low impedance. Accordingly, when the ADD-IN signal is "1", the tristate buffer 108 becomes a buffer with a high impedance and an image signal flows through the masking/UCR portion 107, the image processing portion 112, the tristate buffer 111, and the F value correction portion 109 in the named order. Conversely, when the ADD-IN signal is "0", the tristate buffer 111 becomes a buffer with a high impedance and an image signal flows through the masking/UCR portion 107, the tristate buffer 108, and the F value portion 109 in the named order.

Figures 2, 3:
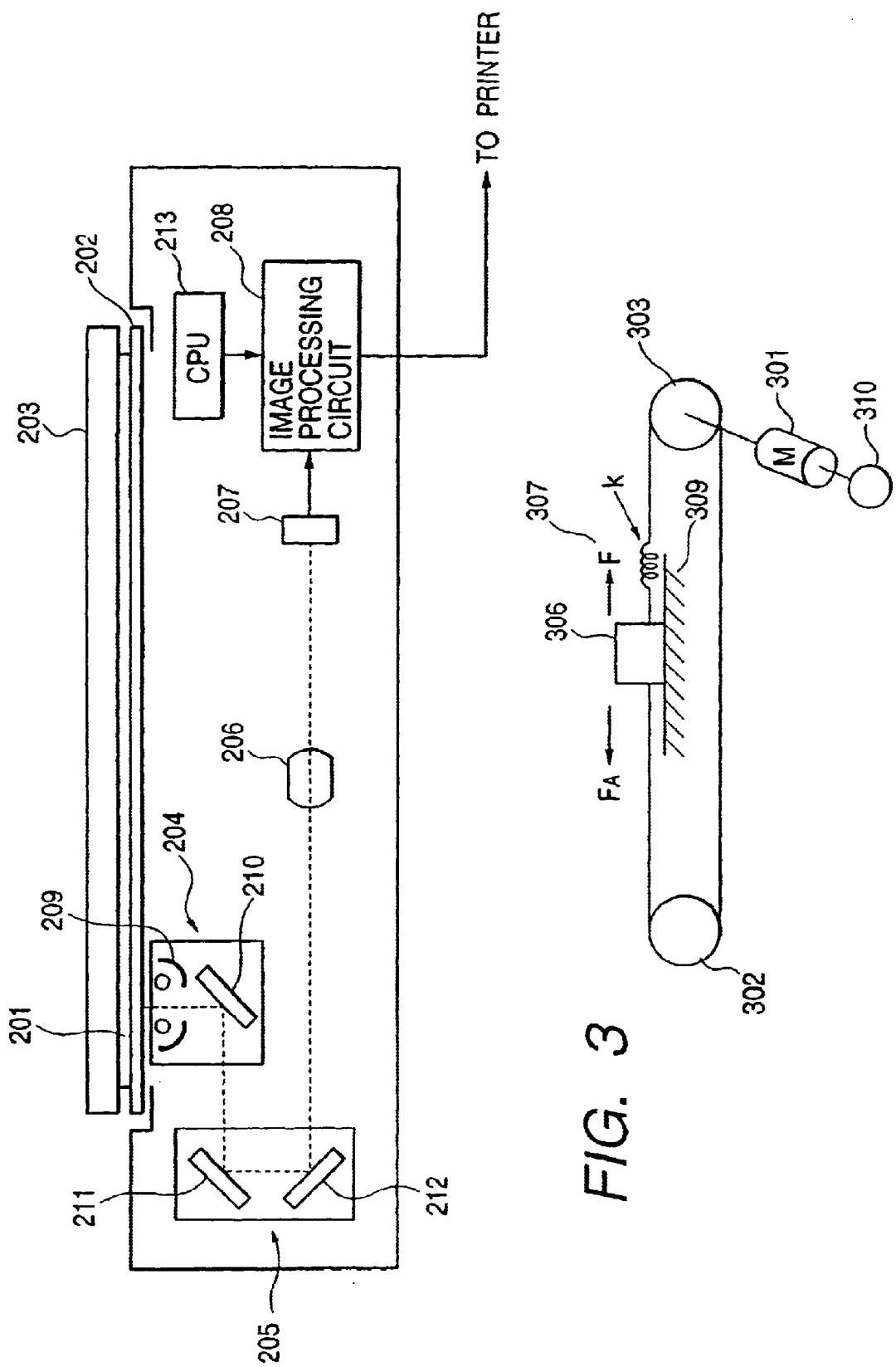
FIG. 2 shows the construction of an image reading apparatus including the image processing circuit of FIG. 1.
FIG. 3 is a schematic, simple view of a moving mechanism provided with only a magnet damper.

FIG. 2 is a block diagram schematically showing the construction of a color image reading apparatus according to the present embodiment.

This apparatus is provided with original supporting glass 202 for supporting an original 201 thereon on the upper portion thereof, and an original supporting table cover 203 for keeping the supported original 201, and below these, there is provided an optical system comprised of an original illuminating lamp 209, a first mirror stand 204, a second mirror stand 205, an imaging lens 206, a color CCD (fixed image element) line sensor (corresponding to CCD 101 in FIG. 1, and hereinafter referred to as the line sensor) 207 having a filter (not shown) for resolving three colors, i.e., R (red), G (green) and B (blue), and an image processing circuit 208.

A mirror 210 is fixed to the first mirror stand 204, and mirrors 211 and 212 are fixed to the second mirror stand 205. A CPU 213 is connected to the image processing circuit 208, the operation of which is controlled by the CPU 213. Also, the design of the device is made such that the original illuminating lamp 209 has its operation controlled by the CPU 213 through a driving circuit, not shown, and the first and second mirror stands 204 and 205 have their operations controlled by the CPU 213 through a driving mechanism, not shown.

Also, the first mirror stand 204 and the original illuminating lamp 209 scan the original 201 placed on the original supporting glass 202 at a speed double that of the second mirror stand 205.

The original 201 placed on the original supporting glass 202 is illuminated by the original illuminating lamp 209. The reflected light from the original is directed by the mirrors 210, 211 and 212, and is imaged on the line sensor 207 through the imaging lens 206. The reflected light is resolved into an R component, a G component and a B component as color image information by the color resolving filter of the line sensor 207, and thereafter is sent to the image processing circuit 208. By the electrical scanning (main scanning) by the line sensor 207 and the mechanical scanning (sub-scanning) by the original illuminating lamp 209 and the mirrors 210 to 212 being repeated, the image information of the whole area of the original is read.

In the image processing circuit 208, the inputted image information is subjected to predetermined image processing, and is outputted as an image signal to a printer or the like connected to the outside.

Figure 9:
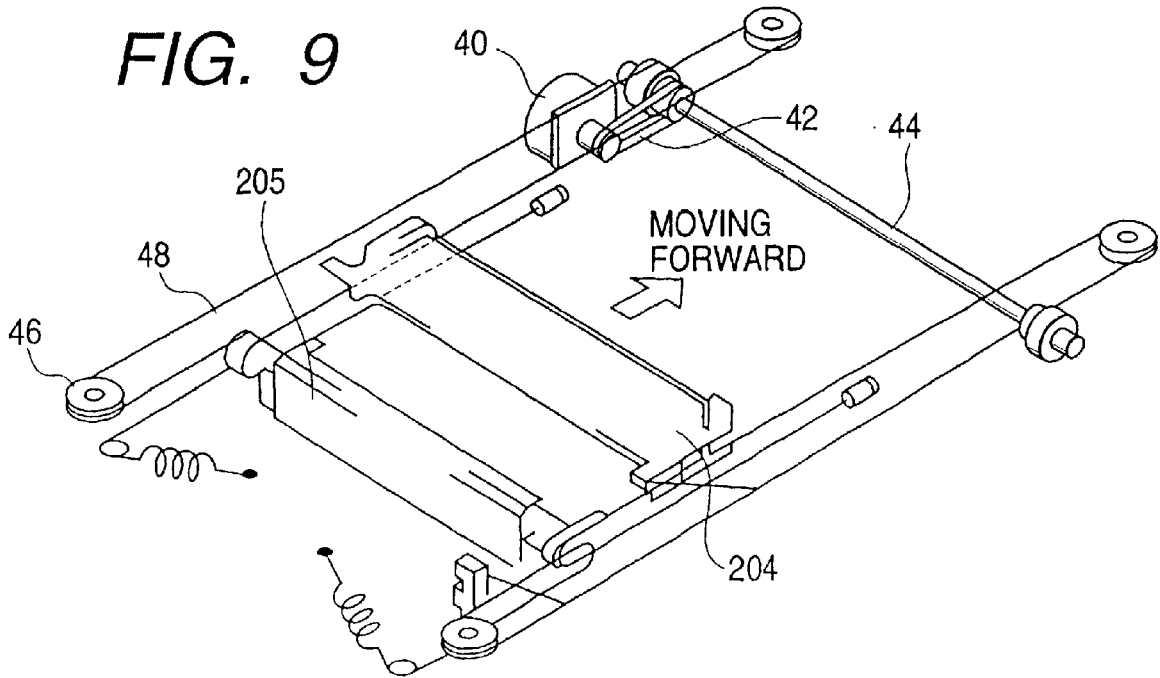
FIG. 9 is a perspective view showing the construction of the moving mechanism of the image reading apparatus shown in FIG. 2.

FIG. 9 is a perspective view showing a moving mechanism for the image reading apparatus to be moved. This construction is an already known construction used in a popular flat bed type image reading apparatus. In order to scan the original, the original illuminating lamp 209, which is an illuminating source, and the first mirror 210 are moved at a predetermined speed as indicated, for example, in the direction of the arrow, and the second and third mirrors 211 and 212 are moved at a half speed of the predetermined speed.

For this purpose, rotation is transmitted from a motor 40 to a rotary shaft 44 through a belt 42, and the rotation of the rotary shaft 44 is further transmitted to a belt 48 passed over a pulley 46, and the original illuminating lamp 209, which is the illuminating source, and the first mirror 210 are carried on the first mirror stand 204 attached to the belt 48, and the second and third mirrors 211 and 212 are carried on the second minor stand 205.

Assuming now that the original image is read when the first mirror stand 204 and the second mirror stand 205 are moved in the direction indicated by the arrow, to obtain an image of high quality that has little jaggedness, it is desirable that the vibration of the first mirror stand and the second mirror stand is as small as possible.

So, in the present invention, a magnet damper has been chosen from among a plurality of kinds of dampers that can be mounted on the motor shaft, and this magnet damper has been examined. In the construction of a moving mechanism having this magnet damper mounted thereon, vibration has occurred when the first mirror 210 is accelerated to a predetermined speed.

FIG. 3 shows a simple view of a moving mechanism having only a magnet damper attached thereto. Here, for the simplification of description, only the first mirror stand is driven, but the same thing can also be said even if the second mirror stand is attached.

In FIG. 3, the reference numeral 301 designates a stepping motor (corresponding to the motor indicated by the reference numeral 40 in FIG. 9) as an example of the drive source of the moving mechanism. The reference numerals 302 and 303 (the reference numerals 46 and 46 in FIG. 9) denote wire pulleys, and the reference numeral 307 designates a minimum necessary force F for moving a first mirror stand 306. The weight of the first mirror stand 306 (the reference numeral 204 in FIG. 9) is W. The reference numeral 309 denotes a rail for the first mirror stand to be parallel-moved. The first mirror stand is moved with a coefficient of friction $\mu$ with respect to the rail.

Here, $F=Fa+\mu W$ ($\mu$: the coefficient of friction).

In FIG. 3, this reference numeral 310 designates a magnet damper which is of a construction to add inertia to the motor shaft by the action of a magnet, and is of such a construction that does not react to or add inertia to the shaft during the accelerating operation, such as the acceleration or deceleration of the motor shaft, but adds inertia when the motor shaft is operated at a constant speed.

Figure 11:
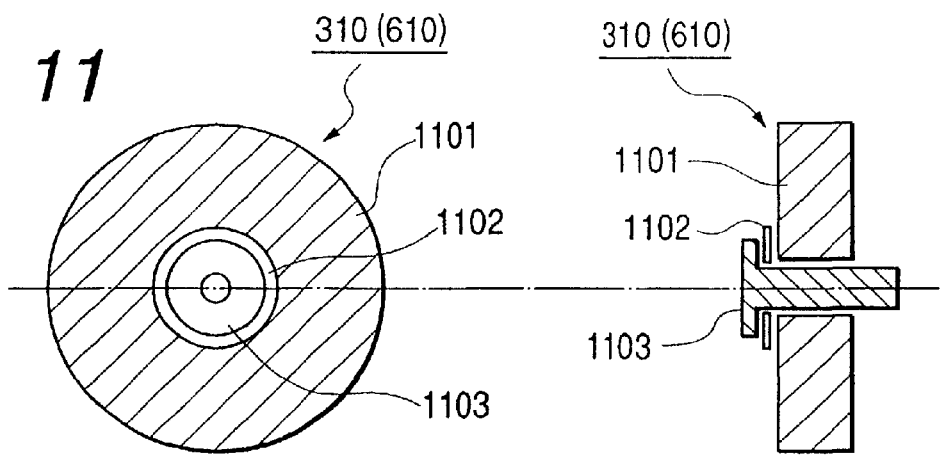
FIG. 11 is a view of the magnet damper shown in FIG. 3.

FIG. 11 shows the configuration of the magnet damper. The reference numeral 1101 designates the inertia member of the magnet. The reference numeral 1103 denotes a hub made of iron. The reference numeral 1102 designates a rulon made of a material of a low coefficient of friction such as Teflon. During the acceleration of the motor, the hub 1103 and the inertia member 1101 of the magnet slidingly move because the rulon 1102 is mounted on the motor shaft and therefore, the inertia of the magnet damper applied to the motor shaft is weak. On the other hand, when the motor shaft is rotated at a constant speed, the hub 1103 and the inertia member 1101 of the magnet are rotated therewith and therefore, the inertia of the magnet damper is applied to the motor shaft.

Figure 5:
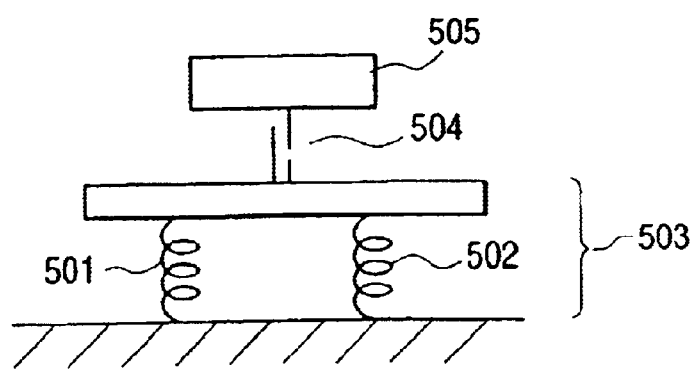
FIG. 5 is a schematic simple equivalent view of the motor using only the magnet damper shown in FIG. 3.

FIG. 5 shows a simple equivalent view of a motor using only a magnet damper. In FIG. 5, the reference numerals 501 and 502 designate springs, and the reference numeral 503 (corresponding to the reference numeral 301 in FIG. 3) denotes a motor that provides a vibration source together with the springs 501 and 502. The reference numeral 504 indicates that the inertia member 505 (corresponding to the reference numeral 1101 in FIG. 11) of the magnet and the motor 503, which is a vibration source, are connected together. Since it is connected by the magnet, the inertia member 505 does not react during acceleration, and the design of the device is made such that when the motor is at a constant speed, the inertia member 505 is applied to the motor 503, which is a vibration source.

Figure 4:
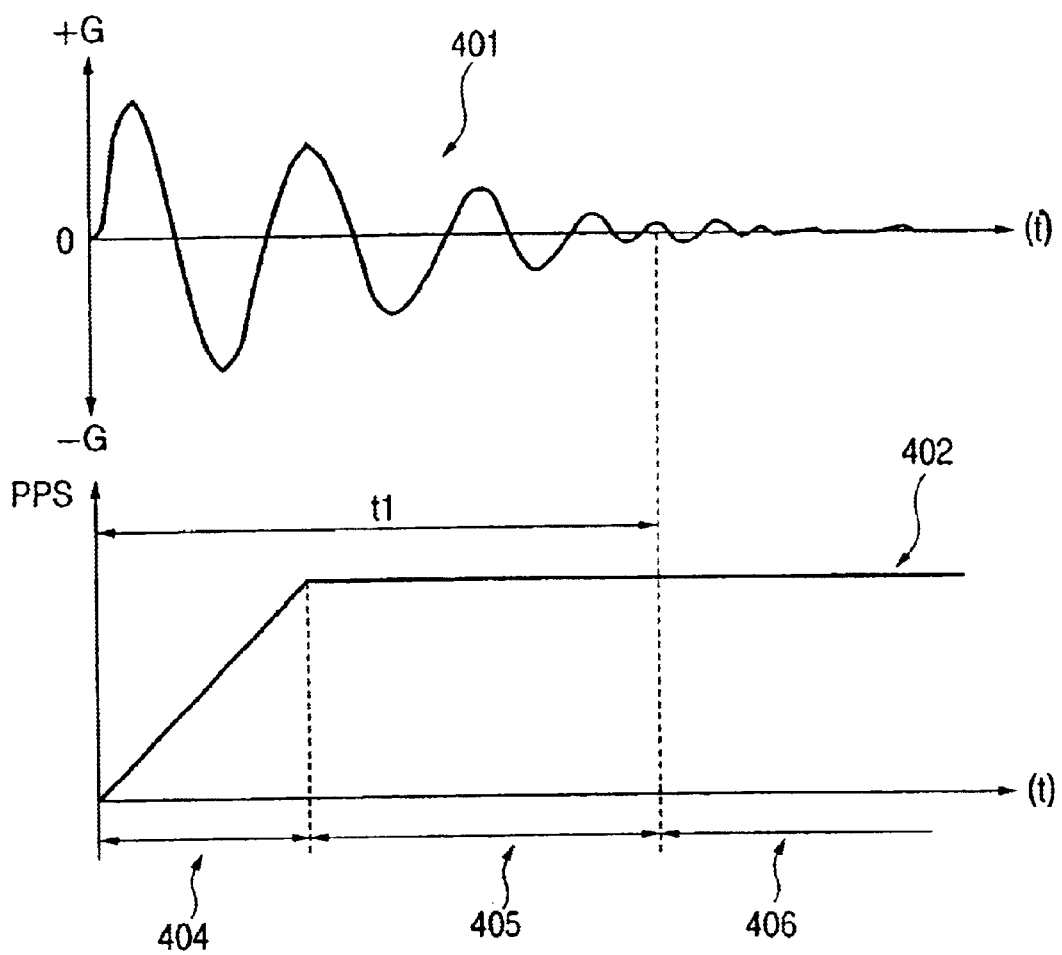
FIG. 4 is a graph showing the relation between the state of the vibration of a first mirror of an image reading apparatus and the speed of a motor shown in FIG. 3.

It is FIG. 4 that shows the relation between the state of the vibration of the first mirror stand 306 when the motor is accelerated and the speed of the motor. In FIG. 4, the reference numeral 401 designates a waveform showing the state of the attenuation of vibration caused during the acceleration of the motor, and the axis in the Y-direction indicates acceleration G, and the axis in the X-direction indicates time t. The reference numeral 402 denotes the acceleration waveform of the motor, and the Y-direction axis represents speed and the X-direction axis represents time t. In the waveform 402, the reference 20 numeral 404 designates an acceleration area, the reference numeral 405 denotes an approach run area for eliminating the vibration produced during the acceleration, and the reference numeral 406 designates an image reading area for reading an image when the vibration during the acceleration becomes null. In a moving mechanism having only a magnet damper mounted thereon, a time t1 was necessary from after the starting of the motor until the vibration during the acceleration was attenuated and image reading became possible.

Here, the present invention mounts one more damper on the motor shaft having a magnet damper mounted thereon, and has chosen as the additional damper a rubber damper from among a plurality of kinds of dampers mountable on the motor shaft.

Figure 6:
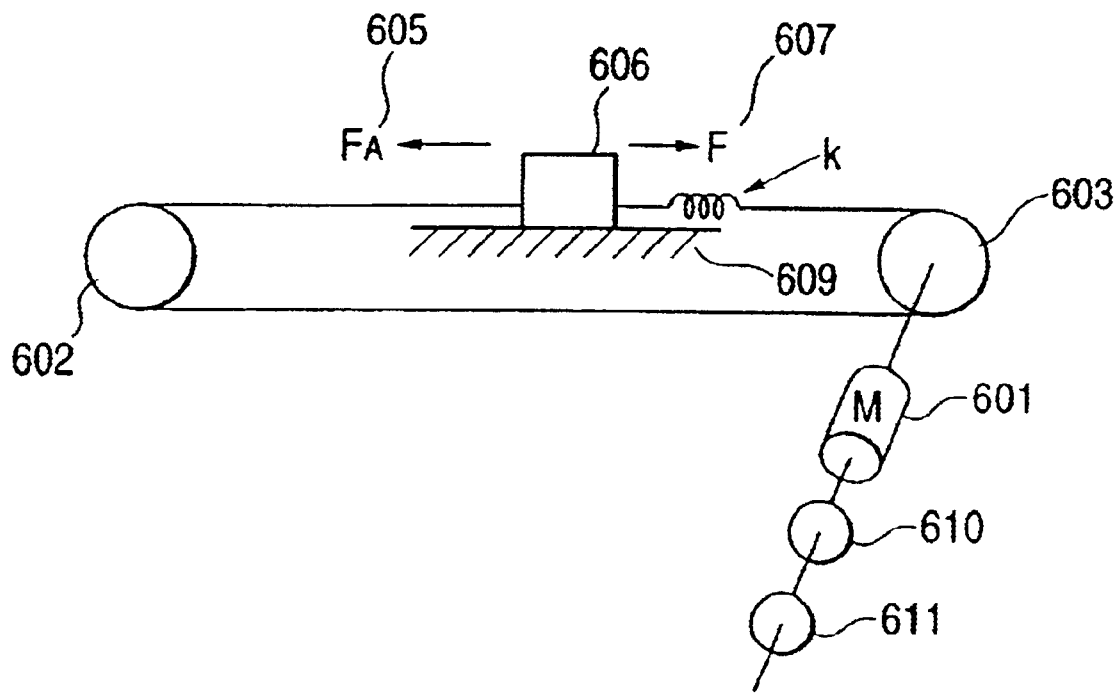
FIG. 6 is a schematic simple view of a moving mechanism according to an embodiment of the present invention using two damper means, i.e., a magnet damper and a rubber damper.

FIG. 6 shows a simple view of a moving mechanism having the two dampers of the present invention, i.e., the magnet damper and the rubber damper, mounted thereon. Here, to simplify the description, only a first mirror stand is driven, but the same thing can be said even if a second mirror is mounted.

In FIG. 6, the reference numeral 601 denotes a stepping motor as an example of the drive source of the moving mechanism. The reference numerals 602 and 603 designate wire pulleys, and the reference numeral 607 denotes a minimum necessary force for moving a first mirror stand 606. The reference numeral 605 designates an extraneous force Fa. The weight of the first mirror stand 606 is W. The reference numeral 609 denotes a rail for the first mirror stand to parallel-move thereon. That is, what are designated by the reference numerals 601 to 609 in FIG. 6 correspond to what are designated by the reference numerals 301 to 309 in FIG. 3. The first mirror stand is moved with a coefficient $\mu$ of friction with respect to the rail.

Here, F=Fa+$\mu$W. ($\mu$: a coefficient of friction)

In FIG. 6, the reference numeral 610 designates a magnet damper designed to add inertia to the motor shaft by a magnet, and it is of such a construction that it does not react or add inertia to the shaft during the accelerating operation of the motor, such as acceleration and deceleration, but adds inertia to the motor shaft when the shaft operates at a constant speed. The reference numeral 611 denotes a rubber damper mounted on the motor shaft to reduce the vibration caused during the acceleration.

The reason why the rubber damper has been chosen as the additional damper will now be described in detail.

Figure 7:
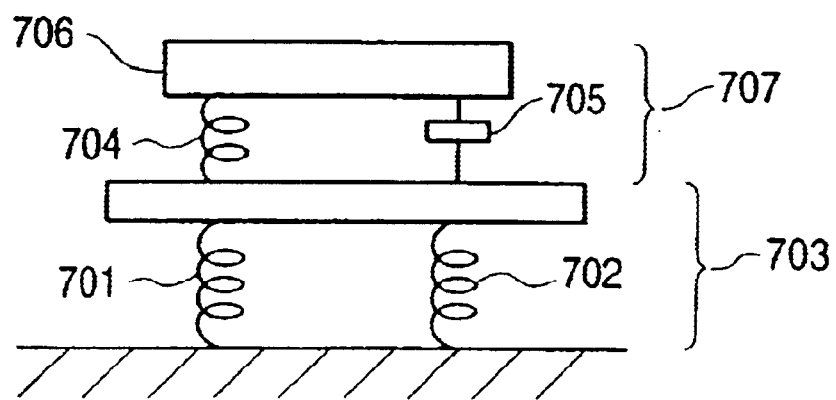
FIG. 7 is a schematic simple equivalent view of a motor using only a rubber damper.

FIG. 7 shows a simple equivalent view of a motor using only a rubber damper. In FIG. 7, the reference numerals 701 and 702 designate springs, and the reference numeral 703 (corresponding to the reference numeral 301 in FIG. 3) denotes a motor that provides a vibration source together with the springs 701 and 702. The reference numeral 704 designates a spring, the reference numeral 705 denotes a dash pot, and the reference numeral 706 designates an inertia-producing element, which is the equivalent constituent of a rubber damper 707.

Figure 10:
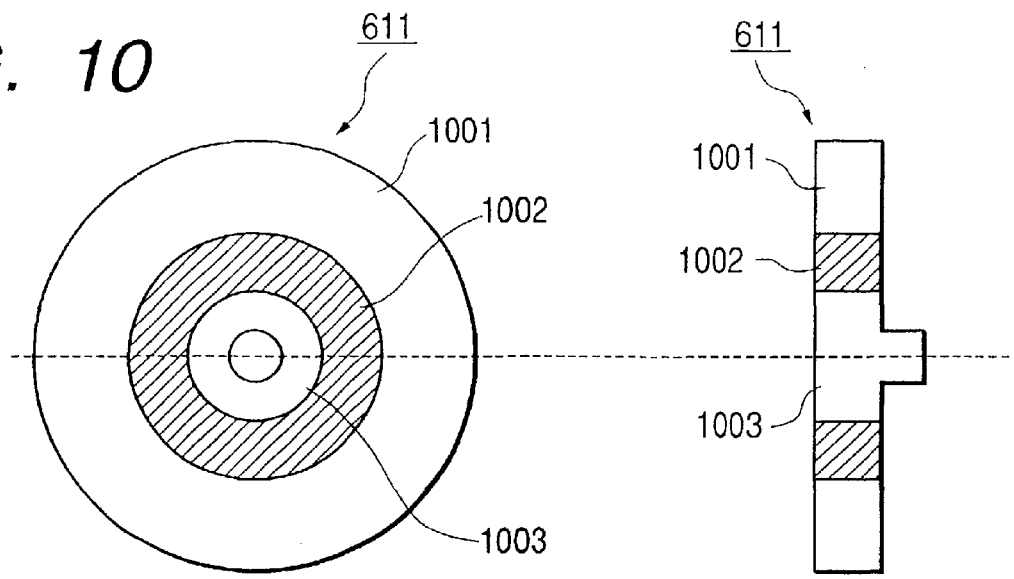
FIG. 10 is a view of the rubber damper shown in FIG. 7.

FIG. 10 shows the configuration of the rubber damper. The reference numeral 1001 denotes an inertia-producing element made of iron or the like. The reference numeral 1003 designates a hub that is connected to the motor shaft. The reference numeral 1002 denotes a rubber material, and by the quality thereof, the characteristics of the spring 704 and the dash pot 705 are changed. Consequently, it becomes possible to load a spring-mass system by the rubber damper in conformity with the natural frequency of a load produced during the acceleration and suppress vibration by the utilization of resonance (hereinafter referred to as the dynamic vibration absorption).

The central frequency of this dynamic vibration absorption is indicated as follows:

$$f=(1/2\pi)\times\{980\times(K/J)\}^{-2},$$

where f: dynamic vibration absorption frequency, k: spring constant (g·cm/rad), J: moment of inertia (g·cm).

Consequently, the vibration during the acceleration is reduced by varying the rubber material 1002 regarding the spring constant and the inertia 1001 and using them in accordance with the natural vibration frequency of the load during the acceleration of an image reading system.

Figure 8:
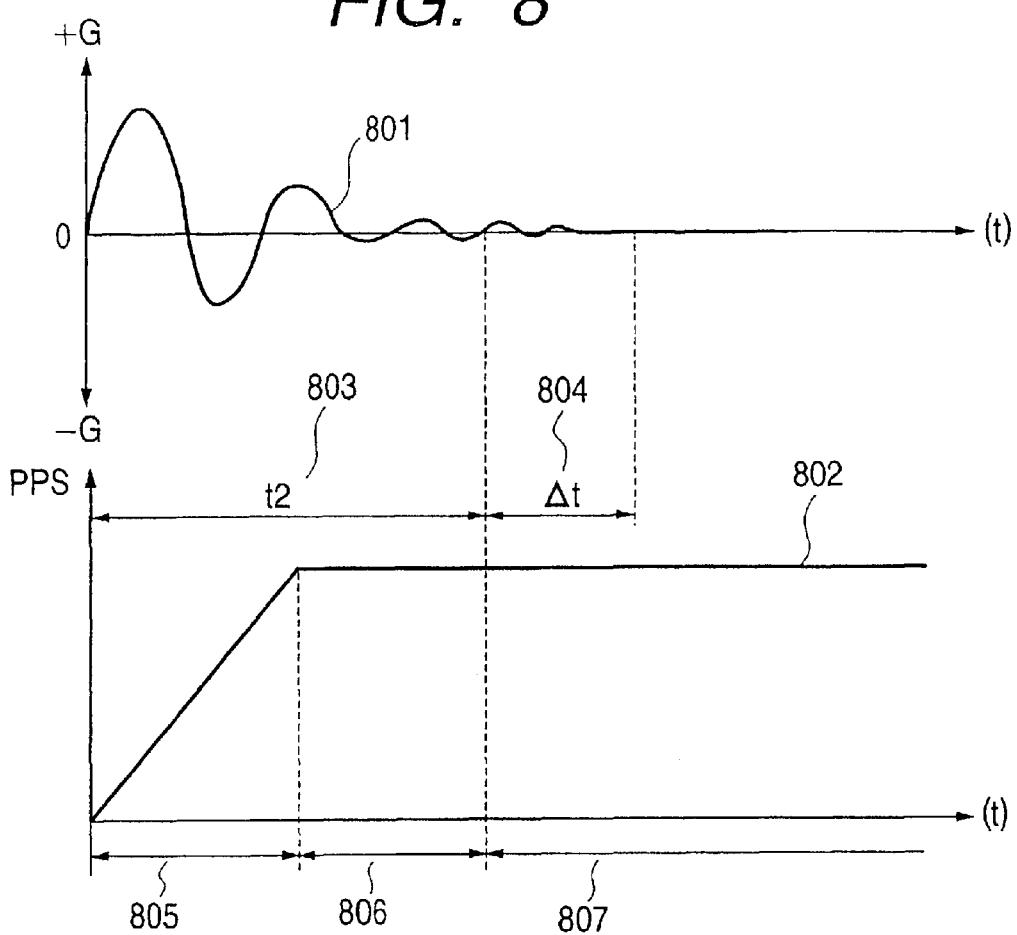
FIG. 8 is a graph showing shows the relation between the state of the vibration of the first mirror of the image reading apparatus and the speed of the motor shown in FIG. 7.

It is FIG. 8 that shows the relation between the state of the vibration of the first mirror stand 606 when the motor is accelerated by the construction of the moving mechanism using this rubber damper and the speed of the motor. In FIG. 8, the reference numeral 801 shows the state of the attenuation of the vibration caused during the acceleration of the motor, and the axis in the Y-direction indicates acceleration G, and the axis in the X-direction indicates time t.

The reference numeral 802 designates the acceleration waveform of the motor, and the Y-direction axis represents speed and the X-direction axis represents time t. In the waveform 802, the reference numeral 805 denotes an acceleration area, the reference numeral 806 designates an approach run area for eliminating the vibration caused during the acceleration, and the reference numeral 807 denotes an image reading area for reading an image when the vibration during the acceleration becomes null.

Here, the time t2 (803), from the starting of the motor until the vibration during the acceleration is attenuated and image reading becomes possible, can be made shorter by Δt (804) than the time t1 of the aforedescribed moving mechanism using only the magnet damper.

As described above, it is possible to reliably and efficiently reduce the natural vibration of the load system caused during the acceleration of the motor by adding a rubber damper to the image reading drive system. As a result, the approach run time for absorbing the vibration caused during the acceleration can be reduced and therefore, the image reading time can be shortened and this contributes to the higher speed of the apparatus. The approach run distance is also shortened and this contributes to the downsizing of the apparatus.

Thus, the present invention has paid attention to the fact that if as in the construction shown in FIG. 6, two damper means are mounted on the motor drive shaft, the vibration caused during the driving of the motor can be reduced, and has particularly derived the possibility of reducing the vibration caused during acceleration and during a constant speed by using a magnet damper as the first damper means and using a rubber damper as the second damper means, and utilizes this in the driving motor for the moving mechanism of an image reading apparatus to thereby shorten the reading time of the image reading apparatus and increase the speed of the apparatus.

Figure 12:
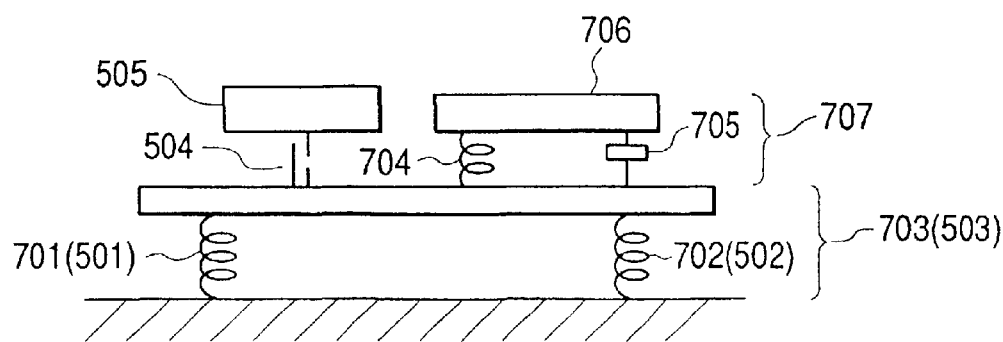
FIG. 12 is a schematic, simple equivalent view of a motor using the magnet damper and the rubber damper shown in FIG. 6.

FIG. 12 shows a simple equivalent view of a motor using two dampers, i.e., a magnet damper and a rubber damper.

In FIG. 12, the reference numerals 701 and 702 designate springs, and the reference numeral 703 (corresponding to the reference numeral 301 in FIG. 3) denotes a motor, which provides a vibration source together with the springs 701 and 702. The reference numeral 704 designates a spring, the reference numeral 705 denotes a dash pot, and the reference numeral 706 designates inertia, which is the equivalent constituent of a rubber damper 707. The reference numeral 504 shows that an inertia member 505 (corresponding to what is designated by the reference numeral 1101 in FIG. 11) by a magnet and a motor 503 which is a vibration source, are connected together. The design of the device is made such that the inertia member 505 does not react during acceleration because it is connected by the magnet, and when the motor is at a constant speed, the inertia member 505 is applied to the motor 503, which is a vibration source.

As described above, according to the present invention, during the acceleration of the motor, it is possible to reliably and efficiently reduce the natural vibration of the load system by the rubber damper, and during the constant speed of the motor, it is possible to smooth the rotation between step angles by the magnet damper, and it is possible to reduce the vibration.

What is claimed is:

1. A driving apparatus comprising:

a rotary shaft rotatably driven;

a first damper attached to said rotary shaft; and a second damper attached to said rotary shaft, wherein said first damper has a first hub as a center of rotation, a rubber material attached to said first hub, and a first inertia member attached to the rubber material, and wherein said second damper has a second hub as a center of rotation, having a magnetic force, a second inertia member having a magnetic force and rotatably fitted into said second hub, and a material provided between said second hub and said second inertia member to transmit a driving force from said second hub by a friction force to said second inertia member.

2. A driving apparatus according to claim 1, wherein said first damper is arranged to absorb the vibration caused when said rotary shaft is accelerated for driving.

3. A driving apparatus according to claim 1, wherein said second damper is arranged to absorb the vibration caused when said rotary shaft drives at a constant speed.

* * * * *

UNITED STATES PATENT AND TRADEMARK OFFICE
CERTIFICATE OF CORRECTION

PATENT NO. : 6,717,298 B2
DATED : April 6, 2004
INVENTOR(S) : Shingo Kitamura et al.

It is certified that error appears in the above-identified patent and that said Letters Patent is hereby corrected as shown below:

<u>Column 2,</u>
Line 21, "shows" should be deleted.

Signed and Sealed this

Ninth Day of November, 2004

JON W. DUDAS
*Director of the United States Patent and Trademark Office*